(12) United States Patent
Kawame et al.

(10) Patent No.: US 9,964,190 B2
(45) Date of Patent: May 8, 2018

(54) GEAR SHIFT OPERATION MECHANISM

(71) Applicant: KEIHIN SEIMITSU KOGYO CO., LTD., Yokohama-shi, Kanagawa (JP)

(72) Inventors: Nobuyuki Kawame, Kanagawa (JP); Masaaki Fusegi, Kanagawa (JP)

(73) Assignee: KEIHIN SEIMITSU KOGYO CO., LTD., Yokohama-shi, Kanagawa (JP)

(*) Notice: Subject to any disclaimer, the term of this patent is extended or adjusted under 35 U.S.C. 154(b) by 0 days. days.

(21) Appl. No.: 15/302,207

(22) PCT Filed: Apr. 22, 2015

(86) PCT No.: PCT/JP2015/062256
§ 371 (c)(1),
(2) Date: Oct. 6, 2016

(87) PCT Pub. No.: WO2015/170593
PCT Pub. Date: Nov. 12, 2015

(65) Prior Publication Data
US 2017/0045125 A1     Feb. 16, 2017

(30) Foreign Application Priority Data

May 9, 2014   (JP) ................................ 2014-097491

(51) Int. Cl.
*F16H 59/00*     (2006.01)
*F16H 25/22*     (2006.01)
(Continued)

(52) U.S. Cl.
CPC ..... *F16H 25/2204* (2013.01); *F16H 25/2015* (2013.01); *F16H 25/22* (2013.01);
(Continued)

(58) Field of Classification Search
CPC .. F16H 25/2204; F16H 25/2015; F16H 25/22; F16H 61/32; F16H 61/34; F16H 63/30; F16H 2025/2043; F16H 2025/2071
See application file for complete search history.

(56) References Cited

U.S. PATENT DOCUMENTS 2,489,474 A * 11/1949 Andren .................. G05G 21/00
                                                    200/36
2,548,175 A *  4/1951 Schellinger ......... F16H 61/0213
                                                    477/106
(Continued)

FOREIGN PATENT DOCUMENTS

CN       102483155 A      5/2012
CN       103089991 A      5/2013
(Continued)

OTHER PUBLICATIONS

International Preliminary Report on Patentability dated Nov. 24, 2016 for the corresponding international application No. PCT/JP2015/062256 (and English translation).
(Continued)

*Primary Examiner* — Zakaria Elahmadi
(74) *Attorney, Agent, or Firm* — Posz Law Group, PLC (57) ABSTRACT

A gear shift operation mechanism capable of achieving reduction in size and weight, reduction in power consumption, simplification and reduction in number of component parts, and cost reduction is provided. A screw shaft that configures a ball screw, a motor that rotates the screw shaft, a nut that is screwed onto the screw shaft, a clutch that is disposed on the screw shaft, and a select lever that is integrated with the screw shaft by switching on the clutch, and has restraint cancelled with respect to the screw shaft by switching off the clutch are included, one end of a main lever is engaged with the nut, the other end is engaged or
(Continued)

connected with a shaft, and the select lever is engaged with the main lever.

12 Claims, 11 Drawing Sheets

(51) Int. Cl.
*F16H 61/32* (2006.01)
*F16H 61/34* (2006.01)
*F16H 63/30* (2006.01)
*F16H 25/20* (2006.01)

(52) U.S. Cl.
CPC ............. *F16H 61/32* (2013.01); *F16H 61/34* (2013.01); *F16H 63/30* (2013.01); *F16H 2025/2043* (2013.01); *F16H 2025/2071* (2013.01); *F16H 2025/2075* (2013.01)

(56) References Cited

U.S. PATENT DOCUMENTS

| | | | | |
|---|---|---|---|---|
| 2,573,919 | A * | 11/1951 | McFarland | F16H 47/08 477/139 |
| 2,706,912 | A * | 4/1955 | Baker | B23Q 5/402 192/18 R |
| 2,775,908 | A * | 1/1957 | Elliott | F16H 37/00 192/104 R |
| 2,948,370 | A * | 8/1960 | Winther | F16H 3/12 192/218 |
| 5,689,997 | A | 11/1997 | Schaller | |
| 5,979,258 | A | 11/1999 | Nakano | |
| 7,246,535 | B2 * | 7/2007 | Berger | F16H 61/32 74/335 |
| 2007/0006673 | A1 * | 1/2007 | Peterman | F16H 63/18 74/329 |
| 2010/0319477 | A1 * | 12/2010 | Tateishi | F16H 25/2454 74/411.5 |
| 2012/0144942 | A1 * | 6/2012 | Yukitake | F16H 61/32 74/335 |
| 2012/0318089 | A1 * | 12/2012 | Uemoto | F16H 61/32 74/473.12 |
| 2013/0008279 | A1 * | 1/2013 | Kagawa | F16H 61/32 74/473.12 |
| 2013/0305855 | A1 | 11/2013 | Skogward | |

FOREIGN PATENT DOCUMENTS

| | | |
|---|---|---|
| CN | 103104698 A | 5/2013 |
| EP | 2 589 840 A2 | 5/2013 |
| EP | 2 594 827 A2 | 5/2013 |
| JP | H10-299892 A | 11/1998 |
| JP | 2003-194215 A | 7/2003 |
| JP | 2014-047870 A | 3/2014 |
| WO | 2005/057051 A1 | 6/2005 |

OTHER PUBLICATIONS

International Search Report of the International Searching Authority dated Jul. 14, 2015 for the corresponding international application No. PCT/JP2015/062256 (and English translation).
Written Opinion of the International Searching Authority dated Jul. 14, 2015 for the corresponding international application No. PCT/JP2015/062256.
Office Action dated Sep. 11, 2017 issued in corresponding CN patent application No. 201580021857.4 (and English translation).

* cited by examiner

FIG. 11

GEAR SHIFT OPERATION MECHANISM

TECHNICAL FIELD

The present invention relates to a gear shift operation mechanism that performs a select operation and a shift operation of a transmission by a motor.

BACKGROUND ART

As a gear shift operation mechanism that performs a select operation and a shift operation of a transmission, there has been conventionally known a gear shift operation mechanism which includes both a selecting motor and a shifting motor (refer to Patent Literature 1, for example). The selecting motor is attached to one end portion of a housing of the gear shift operation mechanism, and a shift shaft is disposed coaxially with a motor shaft of the selecting motor. Further, the shifting motor is attached to the other end portion of the housing, and a motor shaft of the shifting motor is disposed to be orthogonal to the above described shift shaft.

CITATION LIST

Patent Literature

Patent Literature 1: Japanese Patent Laid-Open No. 2003-194215

SUMMARY OF INVENTION

Technical Problem

In Patent Literature 1, the selecting motor and the shifting motor are disposed at both ends of the housing, and parts for moving or rotating the shift shaft are further connected to the respective motors, whereby increase in size of the gear shift operation mechanism, increase in weight, increase in power consumption, complication of the component parts, increase in the number of parts, and increase in cost are caused.

An object of the present invention is to provide a gear shift operation mechanism which is capable of achieving reduction in size and weight, reduction in power consumption, simplification and reduction in the number of component parts, and cost reduction.

Solution to Problem

The entire contents of Japanese Patent Application No. 2014-097491 filed on May 9, 2014 are incorporated in the specification.

In order to solve the aforementioned problem, the present invention is a gear shift operation mechanism that rotates a shaft in a shift direction by a lever, and moves the shaft in a select direction by the lever, including a screw shaft that configures a ball screw, a motor that rotates the screw shaft, a nut that is screwed onto the screw shaft, a clutch that is disposed on the screw shaft, and a select lever that is integrated with the screw shaft by switching on the clutch, and has restraint cancelled with respect to the screw shaft by switching off the clutch, wherein one end of the lever is engaged with the nut, the other end is engaged with the shaft, and the select lever is engaged with the lever.

According to the configuration, by switching on the clutch, the screw shaft and the select lever are integrated and the screw shaft and the select lever are rotated by the motor, whereby the lever is caused to swing around the screw shaft and the shaft can be moved in the select direction. Further, by switching off the clutch, the screw shaft is rotated by the motor, the nut is moved on the screw shaft to cause the lever to swing, and the shaft can be rotated in the shift direction. Accordingly, the shift operation and the select operation of the transmission can be performed with the single motor, reduction in size and weight, reduction in power consumption, simplification and reduction in the number of the component parts, and cost reduction of the gear shift operation mechanism can be achieved.

In the above described configuration, the clutch may be disposed to be close to the motor. According to the configuration, wiring which is connected to the motor and the clutch can be easily organized, and since the length of the wiring can be reduced, the parts and the like which fix the wiring are reduced, whereby cost and the number of assembly steps can be reduced.

Further, in the above described configuration, a shift position sensor which senses a moving distance of the nut may be included. According to the configuration, the moving distance of the nut is sensed by the shift position sensor, and the shift operation state can be obtained.

Further, in the above described configuration, a select position sensor which senses a swing angle of the select lever may be included. According to the configuration, the swing angle of the select lever is sensed by the select position sensor, and the select operation state can be obtained.

Advantageous Effects of Invention

The present invention includes the screw shaft that configures the ball screw, the motor that rotates the screw shaft, the nut that is screwed onto the screw shaft, the clutch that is disposed on the screw shaft, and the select lever that is integrated with the screw shaft by switching on the clutch, and has restraint cancelled with respect to the screw shaft by switching off the clutch, one end of the lever is engaged with the nut, the other end is engaged with the shaft, and the select lever is engaged with the lever. Consequently, the shift operation and the select operation of the transmission can be performed with the single motor, and reduction in size and weight, reduction in power consumption, simplification and reduction in the number of the component parts, and cost reduction of the gear shift operation mechanism can be achieved.

BRIEF DESCRIPTION OF DRAWINGS

FIGS. 4A and 4B are explanatory views showing one example of a gear shift pattern of a gear shift operation by the gear shift operation mechanism, FIG. 4A is a view showing the gear shift pattern.

FIGS. 5A and 5B are operational views showing a shift operation of the gear shift operation mechanism.

FIGS. 6A and 6B are operational views showing a select operation of the gear shift operation mechanism, FIG. 6A is an operational view showing a state where the screw shaft is rotated in one direction in a state where the clutch is switched on, and FIG. 6B is an operational view showing a state where the screw shaft is rotated in the other direction in the state where the clutch is switched on.

FIGS. 7A and 7B are explanatory views showing one end portion of a shaft that is connected to a main lever.

FIGS. 8A and 8B are operational views showing an operation in a case where the shift operation and the select operation are simultaneously performed by the gear shift operation mechanism.

FIGS. 9A and 9B are explanatory views showing one end portion of a shaft in a second embodiment.

FIGS. 10A and 10B are explanatory views showing a main lever of a third embodiment.

DESCRIPTION OF EMBODIMENTS

Hereinafter, respective embodiments of the present invention will be described with reference to the drawings.

First Embodiment

Figure 1:
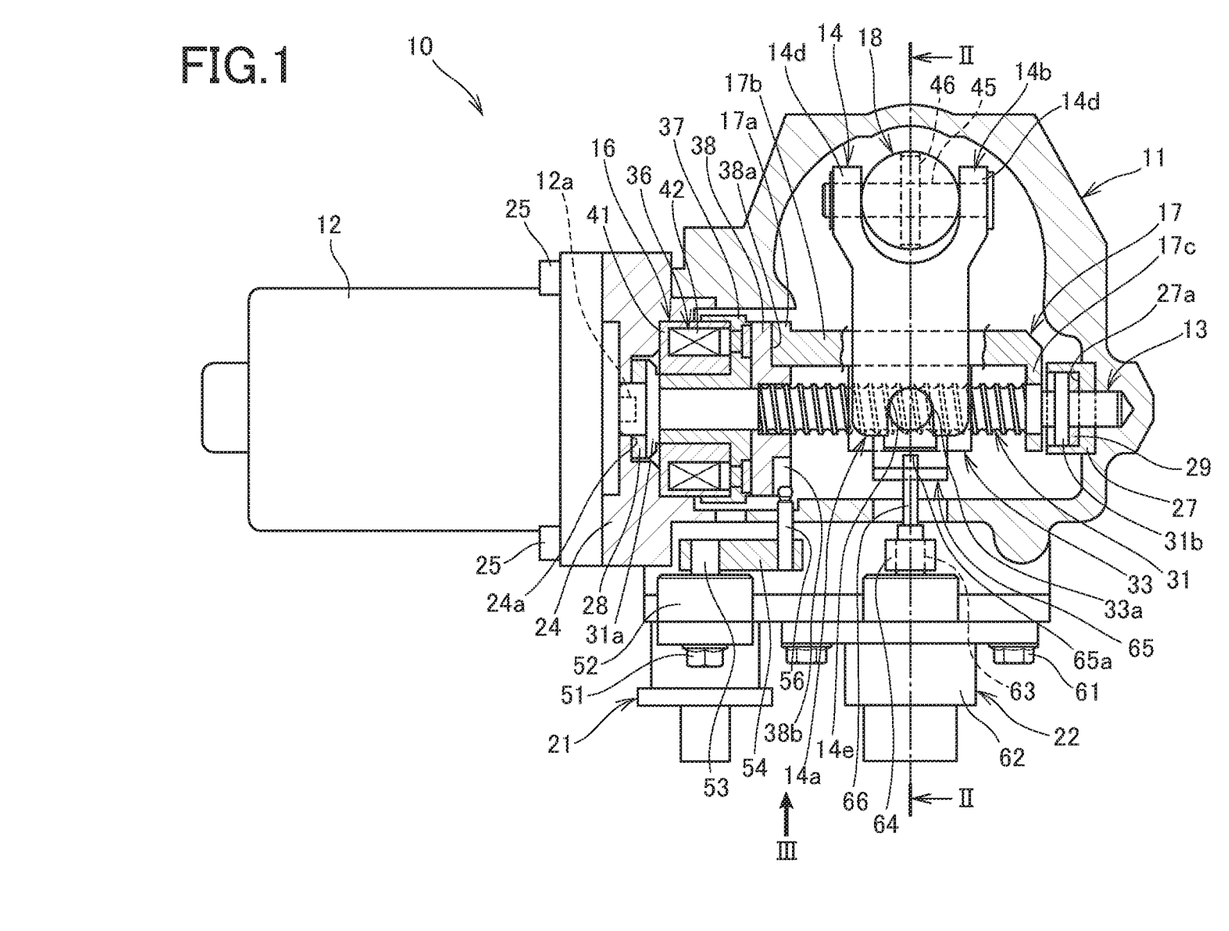
FIG. 1 is a sectional view showing a gear shift operation mechanism of a first embodiment of the present invention.

FIG. 1 is a sectional view showing a gear shift operation mechanism 10 of a first embodiment of the present invention.

The gear shift operation mechanism 10 is a mechanism that is provided in a vehicle such as a truck and a bus that has a mechanical automatic transmission (hereinafter, described as a "transmission") in which a clutch operation is automated, and performs a gear shift operation of the transmission in accordance with a manual operation of a driver, or in accordance with control of an automatic gear shift program. In the present embodiment, the gear shift operation mechanism 10 which operates a transmission with five forward gears and one backward gear will be described.

The gear shift operation mechanism 10 includes a box case 11, a motor 12, a ball screw 13, a main lever 14, a clutch 16, a select lever 17, a shaft 18, a select position sensor 21 and a shift position sensor 22.

In the box case 11, the ball screw 13, the main lever 14, the clutch 16, the select lever 17 and the shaft 18 which are described above are accommodated.

The motor 12 has a battery included in the vehicle as a drive source, is subjected to drive control by a drive control signal that is inputted from a computer included in the vehicle, and is attached to a side surface of the box case 11 with a plurality of bolts 25 via an adapter 24. Note that reference sign 12a designates a rotating shaft of the motor 12.

The ball screw 13 is configured by a screw shaft 31 that has one end attached to the rotating shaft 12a of the motor 12 and the other end supported by a bearing 27 which is provided in the box case 11, and a nut 33 which is coupled to the screw shaft 31 via a plurality of balls (not illustrated). A thrust load occurs to the screw shaft 31 at a time of rotation thereof, and therefore, in order to bear the thrust load, thrust bearings 28 and 29 are respectively provided between an inner side surface 24a of the adapter 24 and a one end flange portion 31a which is provided at one end of the screw shaft 31, and between an inner side surface 27a of the bearing 27 and the other end flange portion 31b which is provided at the other end of the screw shaft 31.

The main lever 14 has one end portion 14a engaged with the nut 33 of the ball screw 13, and the other end portion 14b connected to the shaft 18. The nut 33 is provided with a pair of protruded pins 33a that protrude to both sides of the nut 33 (a front and back direction of a paper surface), and a pair of cutout portions 14e which are provided at one end portion of the main lever 14 are engaged with the pair of protruded pins 33a. The other end portion 14b of the main lever 14 includes two other end arm portions 14d and 14d which are formed into a bifurcated shape.

The clutch 16 is an electromagnetic clutch, and includes a stator 36 which is attached to the adapter 24, a rotor 37 which is rotatably fitted to the stator 36 and is integrally attached to the screw shaft 31, and an armature 38 which is fitted to the screw shaft 31 and is disposed to be adjacent to the rotor 37.

The stator 36 is configured by a core 41 which is attached to the adapter 24, and a coil 42 which is provided in the core 41. The armature 38 is rotatable relatively to the rotor 37 when the coil 42 of the stator 36 is not energized. When the coil 42 is energized, the armature 38 is attracted to the rotor 37 by the core 41 which is excited, and rotates together with the screw shaft 31 and the rotor 37.

The select lever 17 is formed by integrally molding an axial direction extending portion 17b which has one end portion 17a attached to one side surface 38a of the armature 38, and extends along the screw shaft 31 to pass inside the main lever 14, and a perpendicular-to-axis portion 17c which is bent to be orthogonal to the screw shaft 31 with respect to the axial direction extending portion 17b and is rotatably fitted to the screw shaft 31. Accordingly, the select lever 17 rotates together with the armature 38. When the armature 38 rotates, the main lever 14 with which the armature 38 is engaged also rotates (swings).

The shaft 18 is connected to the main lever 14 via a connection pin 45. When the main lever 14 swings with the screw shaft 31 as a center, the shaft 18 is capable of moving in an axial direction (moves to a front and back direction of the paper surface) with respect to the box case 11, and when the nut 33 moves in the axial direction on the screw shaft 31, the shaft 18 is capable of rotating around an axis thereof (rotates around an axis extending in the front and back direction of the paper surface).

The select position sensor 21 is a sensor which senses a swing angle of the select lever 17 around the screw shaft 31 via the armature 38, and is attached to a lower portion of the box case 11.

The select position sensor 21 includes a sensor main body 52 which is attached to the box case 11 with a plurality of bolts 51, a select sensor arm 54 which is attached to a rotating shaft 53 which extends from the sensor main body 52, and a select sensor sensing element 56 which is attached to an end portion of the select sensor arm 54 and is inserted in an engagement groove 38b which is provided in the armature 38.

When the select lever 17 and the armature 38 swing, the select sensor sensing element 56 rotates the rotating shaft 53 of the sensor main body 52 via the select sensor arm 54 with the swing, so that a rotation angle signal corresponding to a rotation angle of the rotating shaft 53 is outputted to the computer of the vehicle from the sensor main body 52, and in the computer, a select operation state of the transmission is obtained.

The shift position sensor 22 includes a sensor main body 62 which is attached to the box case 11 with a plurality of bolts 61, a shift sensor arm 64 which is attached to a rotating shaft 63 which extends from the sensor main body 62, and a shift sensor sensing element 66 which is attached to an end portion of the shift sensor arm 64 and is inserted in a guide groove 65*a* of a guide member 65 which is provided at a lower portion of the nut 33.

Figure 2:
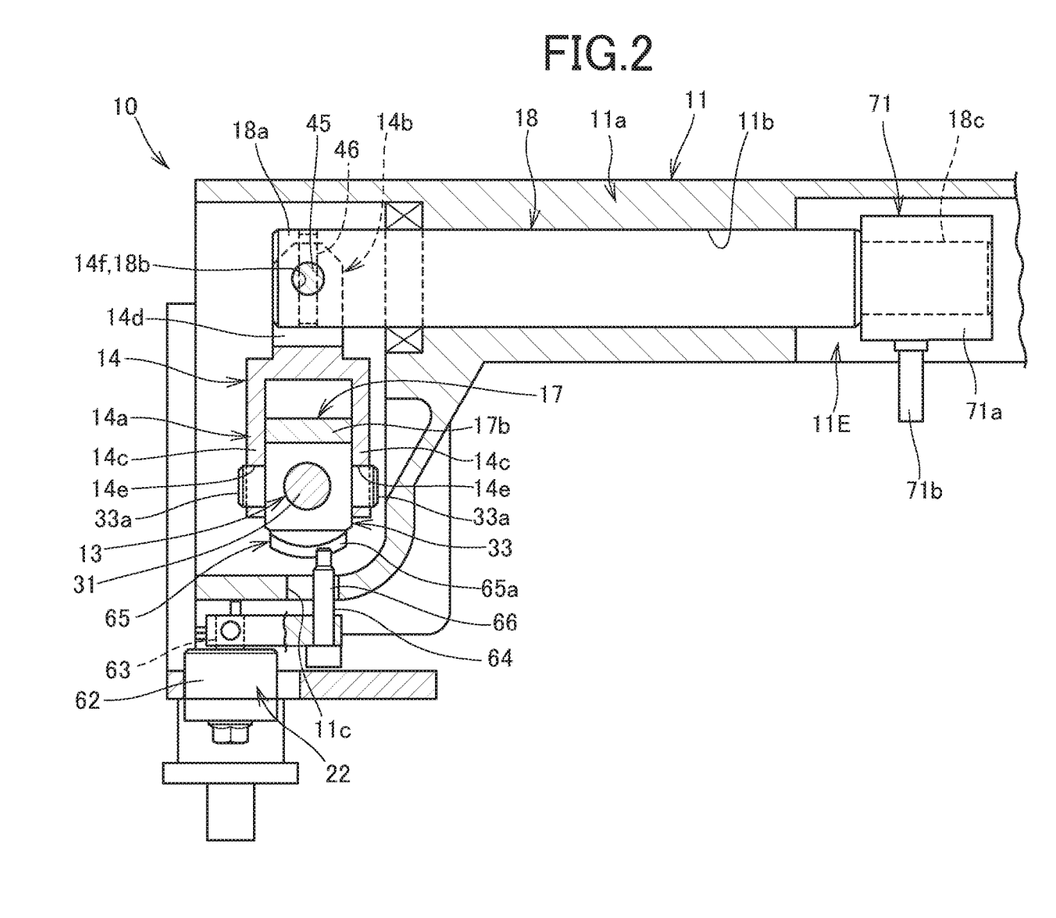
FIG. 2 is a sectional view along line II-II in FIG. 1.

FIG. 2 is a sectional view along line II-II in FIG. 1.

In the box case 11, a shaft insertion section 11*a* through which the shaft 18 is passed is formed at an upper portion thereof. A shaft insertion hole 11*b* is formed in the shaft insertion section 11*a*, and in the shaft insertion hole 11*b*, the shaft 18 is inserted to be movable in an axial direction and rotatable around an axis.

The main lever 14 is laid over the nut 33 of the ball screw 13 and the one end portion 18*a* of the shaft 18.

The one end portion 14*a* of the main lever 14 includes a pair of one end arm portions 14*c* and 14*c* which are formed into a bifurcated shape, and cutout portions 14*e* of the one end arm portions 14*c* and 14*c* are respectively engaged with the pair of protruded pins 33*a* of the nut 33 to be swingable. The select lever 17 is inserted in between the pair of one end arm portions 14*c* and 14*c* to have substantially no clearance and to be relatively movable with respect to the one end arm portions 14*c* and 14*c*.

In the other end portion 14*b* of the main lever 14, pin insertion holes 14*f* are respectively bored in the pair of the other end arm portions 14*d*, a pin insertion hole 18*b* is bored in the one end portion 18*a* of the shaft 18, the connection pin 45 is inserted in these pin insertion holes 14*f* and 18*b*, and the main lever 14 and the shaft 18 are connected. Further, a penetration pin 46 penetrates through the shaft 18 and the connection pin 45 to be orthogonal to respective axial directions of the shaft 18 and the connection pin 45. Thereby, movement in the axial direction and movement in a direction perpendicular to an axis of the connection pin 45 with respect to the pin insertion hole 18*b* of the shaft 18 are restricted.

In the shaft 18, a gear shift lever member 71 is attached to the other end portion 18*c*. The gear shift lever member 71 is disposed in a gear shift lever space 11E which is formed in the shaft insertion section 11*a*, and includes a tubular portion 71*a* which is fitted onto the other end portion 18*c* of the shaft 18, and a gear shift lever 71*b* which is provided on an outer circumferential surface of the tubular portion 71*a* to protrude.

The gear shift lever 71*b* is selectively engaged in respective portions of a gear shift lever input section of a transmission (not illustrated), and selection of a gear shift position (any one of the five forward gears and one backward gear) by movement in the axial direction and rotation of the shaft 18 is made possible.

When the nut 33 moves on the screw shaft 31 and the main lever 14 swings in the front and back direction of the drawing, the guide member 65 moves with the nut 33, whereby the shift sensor sensing element 66 rotates the rotating shaft 63 of the sensor main body 62 via the shift sensor arm 64, so that a rotation angle signal corresponding to the rotation angle of the rotating shaft 63 is outputted to the computer of the vehicle from the sensor main body 62, and in the computer, a shift operation state of the transmission is obtained.

The shift position sensor 22 is a sensor which senses a moving amount along the screw shaft 31 of the nut 33 via the guide member 65, and is attached to the lower portion of the box case 11. Reference sign 11*c* designates a window portion which is provided at the lower portion of the box case 11 to insert the shift sensor sensing element 66 of the shift position sensor 22 to inside from outside of the box case 11.

Figure 3:
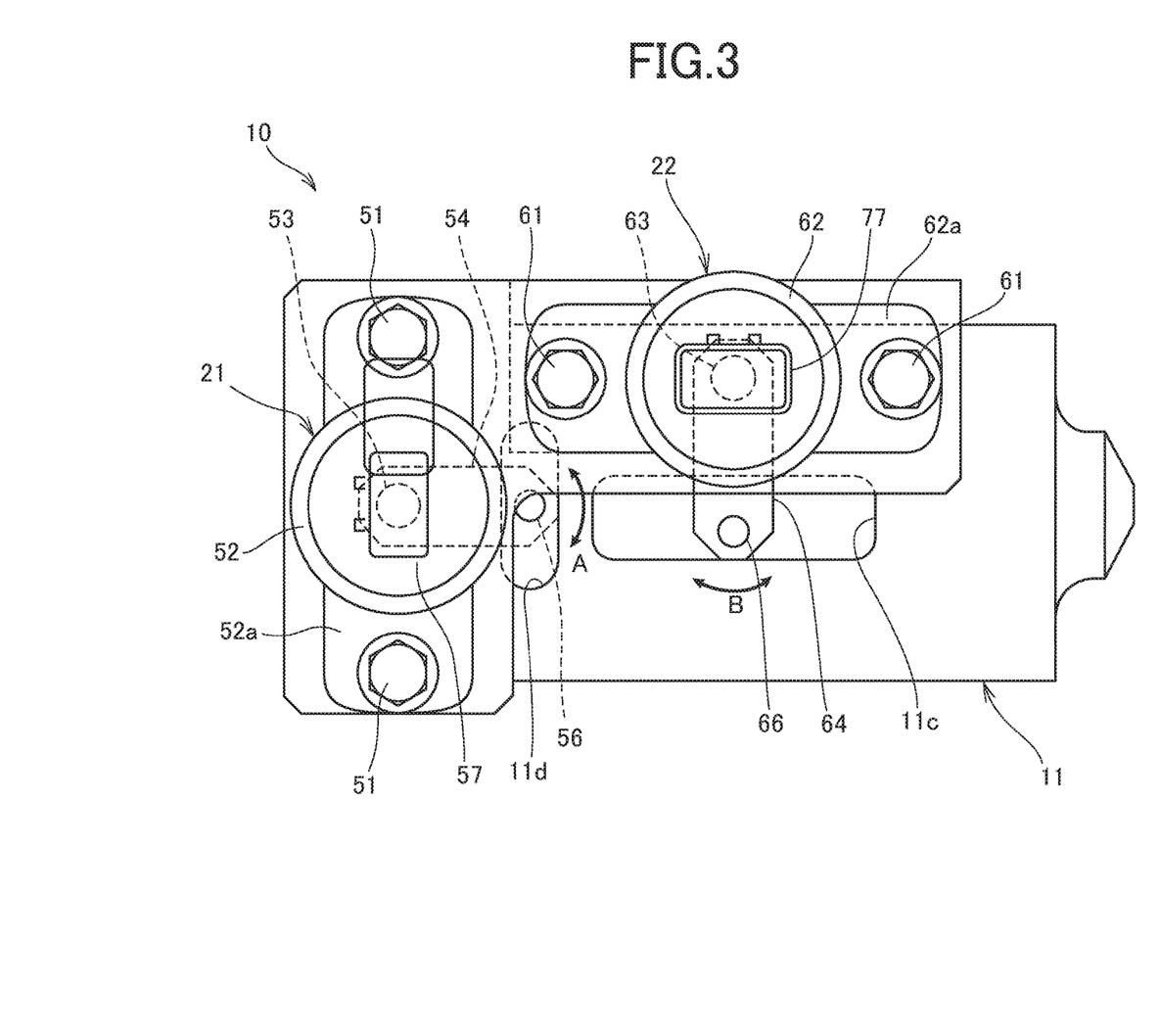
FIG. 3 is a bottom view showing a gear shift operation mechanism.

FIG. 3 is a bottom view showing the gear shift operation mechanism 10, and is a view seen from an arrow III in FIG. 1.

The select position sensor 21 includes a rectangular flange 52*a* at the sensor main body 52. Bolts 51 are inserted into bolt insertion holes (not illustrated) which are provided in the flange 52*a*, tip ends of the bolts 51 are fastened to screw holes at the box case 11 side by screws, and the select position sensor 21 is attached to the box case 11.

The select sensor arm 54 of the select position sensor 21 swings in an arrow A direction in FIG. 3 with the select sensor sensing element 56 with swing of the select lever 17 (refer to FIG. 1). As a result, the rotating shaft 53 of the sensor main body 52 rotates, and an electric signal corresponding to a swing angle of the select lever 17 is outputted from the sensor main body 52. Reference sign 57 designates an output connector which is provided at the sensor main body 52 to connect a conducting wire which takes an output of the sensor main body 52 to outside.

The shift position sensor 22 includes a rectangular flange 62*a* at the sensor main body 62. Bolts 61 are inserted into bolt insertion holes (not illustrated) which are provided at the flange 62*a*, tip ends of the bolts 61 are fastened to screw holes at the box case 11 side with screws, and the shift position sensor 22 is attached to the box case 11.

The shift sensor arm 64 of the shift position sensor 22 swings in a direction of an arrow B in the drawing together with the shift sensor sensing element 66, with movement of the nut 33 (refer to FIG. 1). As a result, the rotating shaft 63 of the sensor main body 62 rotates, and an electric signal corresponding to a moving amount of the nut 33 is outputted from the sensor main body 62. Reference sign 11*d* designates a window portion which is provided in a lower portion of the box case 11 to insert the select sensor sensing element 56 of the select position sensor 21 to inside from outside of the box case 11, and reference sign 77 designates an output connector which is provided at the sensor main body 62 to connect a conducting wire which takes an output of the sensor main body 62 to outside.

Figure 4A:
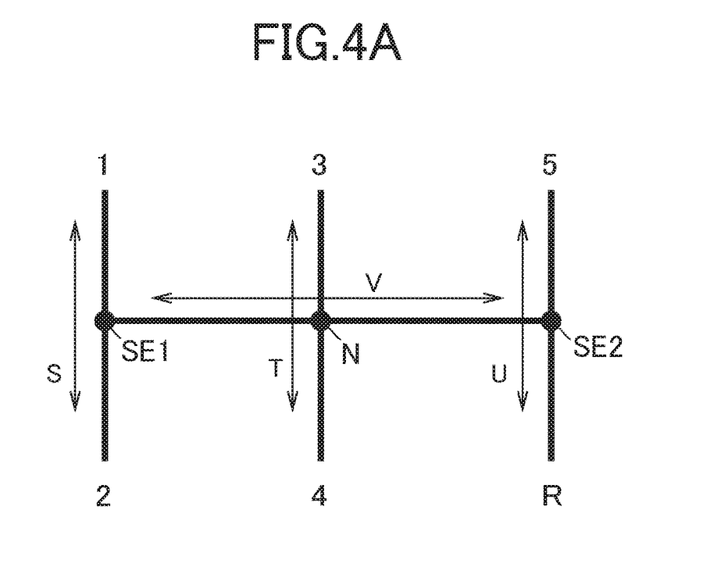
Figure 4B:
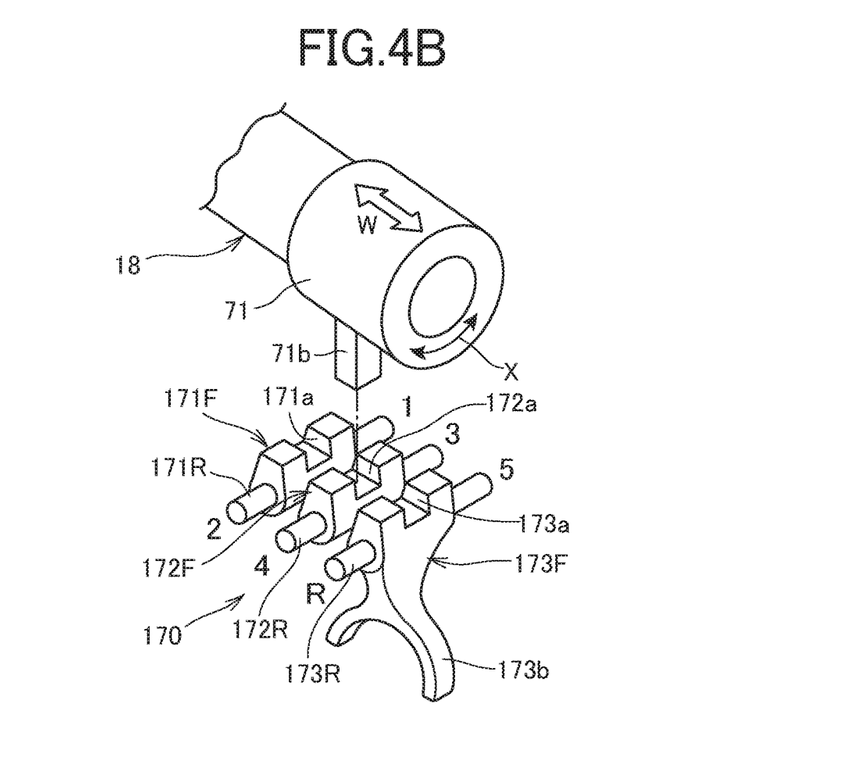
FIG. 4B is a view showing a gear shift lever member and a gear shift lever input section of a shaft.

FIGS. 4A and 4B are explanatory diagrams showing one example of a gear shift pattern of a gear shift operation by the gear shift operation mechanism 10, FIG. 4A is diagram showing a gear shift pattern, and FIG. 4B is a diagram showing the gear shift lever member 71 of the shaft 18 and a gear shift lever input section 170.

As shown in FIG. 4A, the gear shift pattern having gear shift positions of five forward gears and one backward gear is provided with a first shift direction S to shift up or shift down between a first speed and a second speed, a second shift direction T to shift up or shift down between a third speed and a fourth speed, and a third shift direction U to shift between a fifth speed and a reverse R (backward). Further, the gear shift pattern is provided with a select direction V to shift between a neutral position N which is located between the third speed and the fourth speed, and a first select position SE1 which is located between the first speed and the second speed, and between the neutral position N and a second select position SE2 which is located between the fifth speed and the reverse.

The neutral position N is an initial position of the gear shift position.

As shown in FIG. 4B, the gear shift lever 71b which is provided at the gear shift lever member 71 of the shaft 18 faces the gear shift lever input section 170 which is provided in the transmission.

The gear shift lever input section 170 includes rods 171R, 172R and 173R, and shift forks 171F, 172F and 173F which are movably supported respectively by the rods 171R, 172R and 173R.

The shift forks 171F, 172F and 173F are provided with concave-shaped engagement portions 171a, 172a and 173a at one ends, and a fork main body portion 173b (only the fork main body portion 173b of the shift fork 173F is illustrated) at the other end.

The gear shift lever 71b is selectively engaged with the engagement portions 171a, 172a and 173a. In FIG. 4B, the gear shift lever 71b is separated from the engagement portions 171a, 172a and 173a for convenience.

A fork main body portion 171b moves a sleeve (not illustrated) and causes a predetermined shift gear pair of the transmission to mesh with each other.

By moving the shaft 18 in a select direction shown by a white arrow W, the gear shift lever 71b is selectively engageable with any one of the engagement portions 171a, 172a and 173a of the shift forks 171F, 172F and 173F, and by rotating the shaft 18 in a direction of an arrow X, any one of the shift forks 171F, 172F and 173F is moved in the shift direction by the gear shift lever 71b which is engaged with any one of the engagement portions 171a, 172a and 173a, and can be shifted to the side of the first speed, the third speed or the five speed, or the side of the second speed, the fourth speed or the reverse R. A structure of the gear shift lever input section 170 is not limited to the above structure.

An operation of the gear shift operation mechanism 10 described above will be explained next.

Figure 5A:
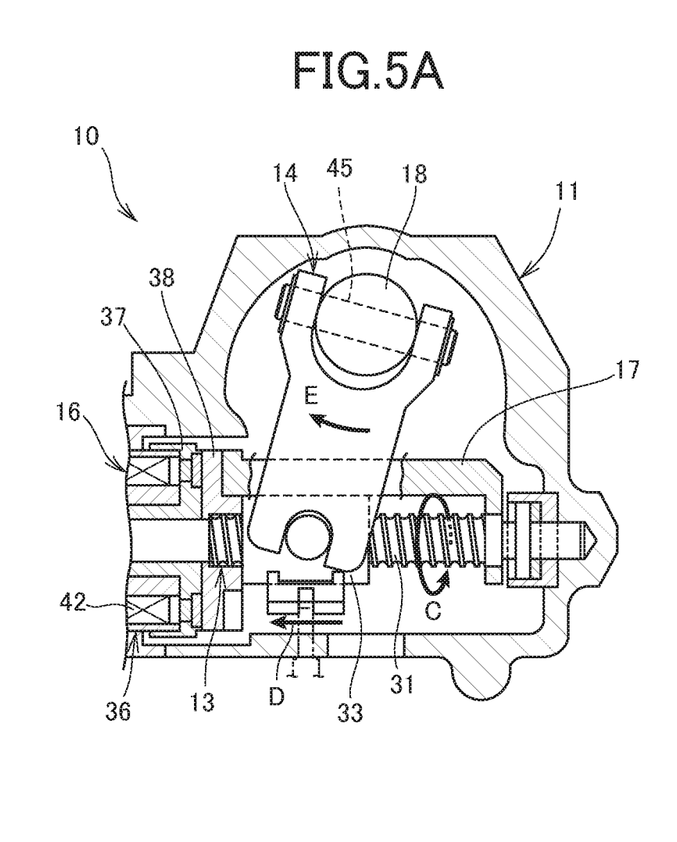
FIG. 5A is an operational view showing a state where a screw shaft is rotated in one direction in a state where a clutch is switched off.
Figure 5B:
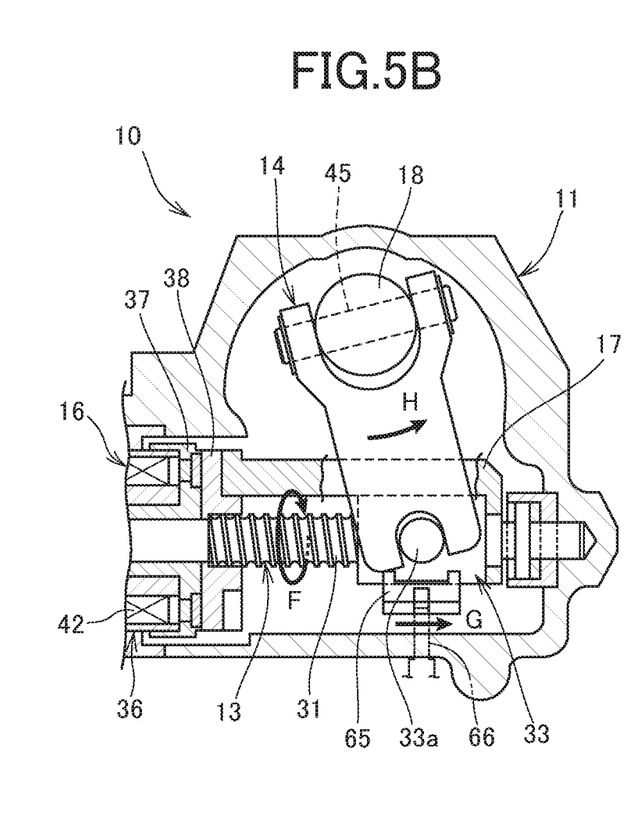
FIG. 5B is an operational view showing a state where the screw shaft is rotated in the other direction in the state where the clutch is switched off.

FIGS. 5A and 5B are operational views showing a shift operation of the gear shift operation mechanism 10, FIG. 5A is an operational view showing a state where the screw shaft 31 is rotated in one direction in a state where the clutch 16 is switched off, and FIG. 5B is an operational view showing a state where the screw shaft 31 is rotated in the other direction in the state where the clutch 16 is switched off.

As shown in FIG. 5A, in a state where energization for the coil 42 of the stator 36 is stopped, and the clutch 16 is switched off, the stator 36 is not excited, and therefore the rotor 37 and the armature 38 are not restrained by the stator 36. When the motor is operated to rotate the screw shaft 31 of the ball screw 13 in a direction of an arrow C in this state, the rotor 37 rotates with the screw shaft 31, and the armature 38 and the select lever 17 are in a stationary state.

The nut 33 moves to a side closer to the motor as shown by an arrow D. With this, the main lever 14 rotates with the shaft 18 as a center, as shown by an arrow E. As a result, the gear shift lever 71b (refer to FIG. 2) also swings in an E direction, and gears are shifted to the first speed from the first select position SE1, to the third speed from the neutral position N, or to the fifth speed from the second select position SE2, in FIGS. 4A and 4B.

Further, as shown in FIG. 5B, when the motor is operated to rotate the screw shaft 31 of the ball screw 13 in a direction of an arrow F, in a state where energization for the coil 42 of the stator 36 is stopped, and the clutch 16 is switched off, the rotor 37 rotates with the screw shaft 31, and the armature 38 and the select lever 17 are in a stationary state.

The nut 33 moves to a side away from the motor as shown by an arrow G. With this, the main lever 14 rotates with the shaft 18 as the center, as shown by an arrow H. As a result, the gear shift lever 71b (refer to FIG. 2) also swings in an H direction, and gears are shifted to the second speed from the first select position SE1, to the fourth speed from the neutral position N, or to the reverse from the second select position SE2, in FIGS. 4A and 4B.

Figure 6A:
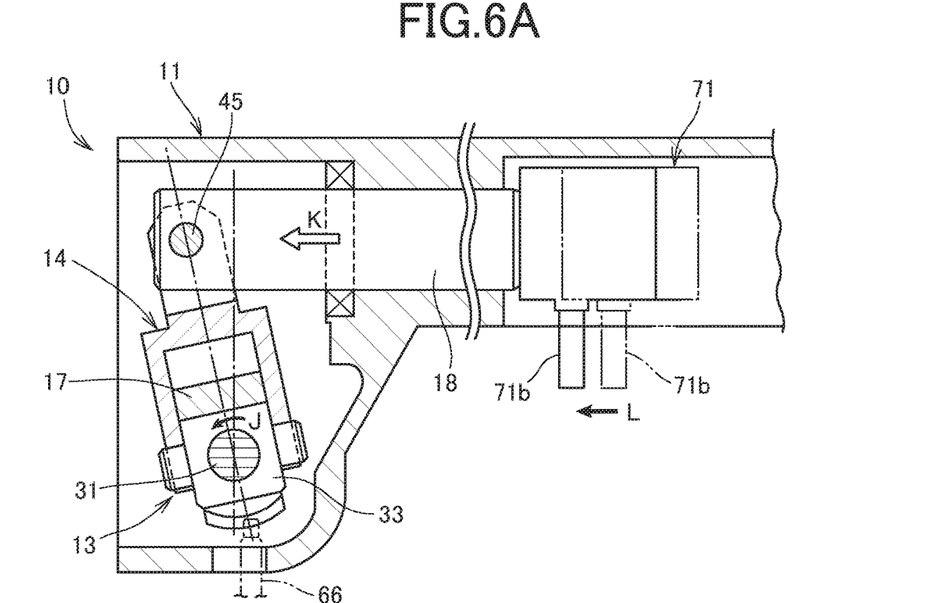
Figure 6B:
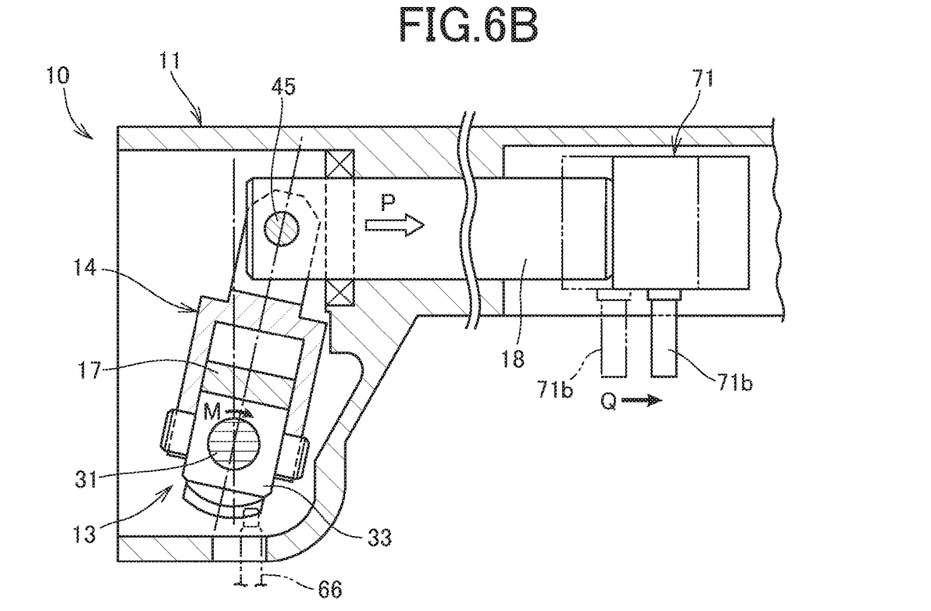

FIGS. 6A and 6B are operational views showing a select operation of the gear shift operation mechanism 10, FIG. 6A is an operational view showing a state where the screw shaft 31 is rotated in one direction in a state where the clutch 16 (refer to FIG. 1) is switched on, and FIG. 6B is an operational view showing a state where the screw shaft 31 is rotated in the other direction in the state where the clutch 16 is switched on.

In FIG. 1, in a state where the coil 42 of the stator 36 is energized to excite the stator 36, and the rotor 37 is caused to attract the armature 38 to switch on (engage) the clutch 16, the armature 38 is restrained by the rotor 37. When the motor is operated and the screw shaft 31 of the ball screw 13 is rotated in a direction of an arrow J in this state, as shown in FIG. 6A, the select lever 17 rotates integrally with the screw shaft 31, and the main lever 14 also rotates in the direction of the arrow J integrally with the select lever 17. As a result, the shaft 18 moves as shown by a white arrow K, the gear shift lever 71b moves in a direction of an arrow L, and therefore in FIGS. 4A and 4B, the gear shift lever 71b moves to the first select position SE1 at a side of the first speed to the second speed from the neutral position N in the select direction, for example.

Since at this time, the screw shaft 31 and the select lever 17 integrally rotate, the screw shaft 31 and the select lever 17, and the nut 33 integrally rotate, and therefore, the screw shaft 31 and the nut 33 do not relatively rotate.

Further, When the motor is operated to rotate the screw shaft 31 of the ball screw 13 in a direction of an arrow M as shown in FIG. 6B in a state where the clutch 16 is switched on, the select lever 17 rotates integrally with the screw shaft 31, and the main lever 14 also rotates in the direction of the arrow M integrally with the select lever 17. As a result, the shaft 18 moves as shown by a white arrow P, the gear shift lever 71b moves in a direction of an arrow Q, and therefore in FIGS. 4A and 4B, the gear shift lever 71b moves from the neutral position N to the second select position SE2 at a side of the fifth speed to the reverse R in the select direction, for example.

Figure 7A:
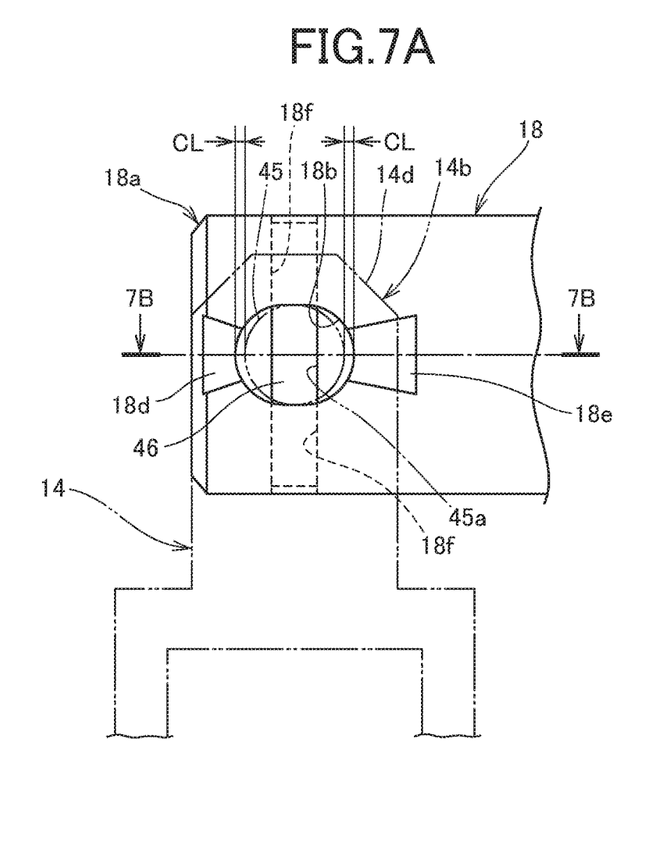
FIG. 7A is a side view of the one end portion of the shaft.
Figure 7B:
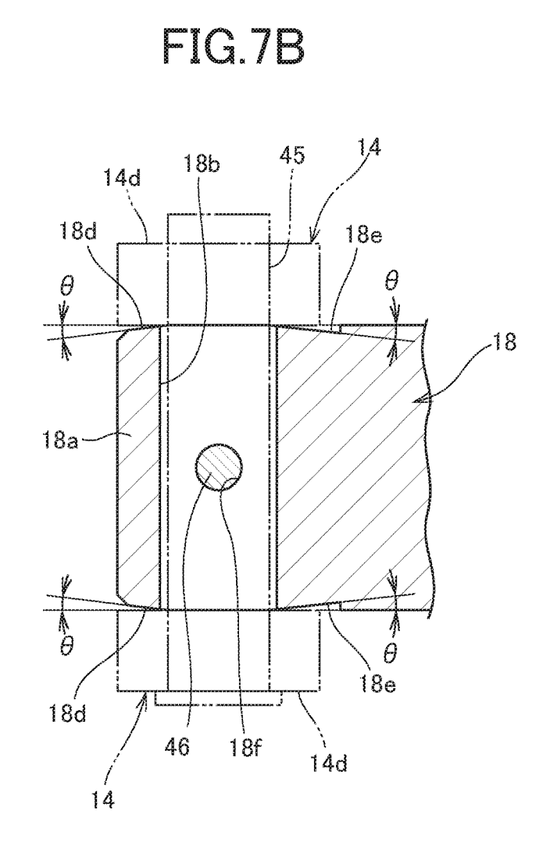
FIG. 7B is a sectional view along line 7B-7B in FIG. 7A.

FIGS. 7A and 7B are explanatory views showing the one end portion 18a of the shaft 18 which is connected to the main lever 14, FIG. 7A is a side view of the one end portion 18a of the shaft 18, and FIG. 7B is a sectional view along line 7B-7B in FIG. 7A.

As shown in FIG. 7A, in the shaft 18, the pin insertion hole 18b with an elliptical section in which the columnar connection pin 45 is inserted is bored in the one end portion 18a. The pin insertion hole 18b has a long axis of an elliptical shape formed to extend in the axial direction of the shaft 18. At an edge portion in the long axis direction of the pin insertion hole 18b, inclined surfaces 18d and 18e which are disposed to be gradually nearer to a central side in a radial direction of the shaft 18 as the inclined surfaces 18d and 18e are away in the axial direction of the shaft 18 from the edge portion. Reference signs 18f and 18f designate a pin insertion hole which is bored in the shaft 18 to insert the penetration pin 46 into the shaft 18 rotatably, reference sign 45*a* designates a pin penetration hole which is bored in the connection pin 45 to press-fit the penetration pin 46 therein, and reference sign CL designates a one side clearance between the pin insertion hole 18*b* and the connection pin 45 in the long axis direction of the pin insertion hole 18*b*.

As shown in FIG. 7B, the inclined surfaces 18*d* and 18*e* of the shaft 18 are formed into flat surfaces, and are each inclined at an angle θ with respect to an outer circumferential surface of the shaft 18. By the inclined surfaces 18*d* and 18*e*, the other end arm portions 14*d* and 14*d* of the main lever 14 also can incline to be along the inclined surfaces 18*d* and 18*e* when the connection pin 45 inclines in the pin insertion hole 18*b*. At this time, the connection pin 45 inclines in the pin insertion hole 18*b* with the penetration pin 46 as a center, substantially without moving in an axial direction and a direction perpendicular to the axis (the long axis direction of the pin insertion hole 18*b*) of the connection pin 45.

Figure 8A:
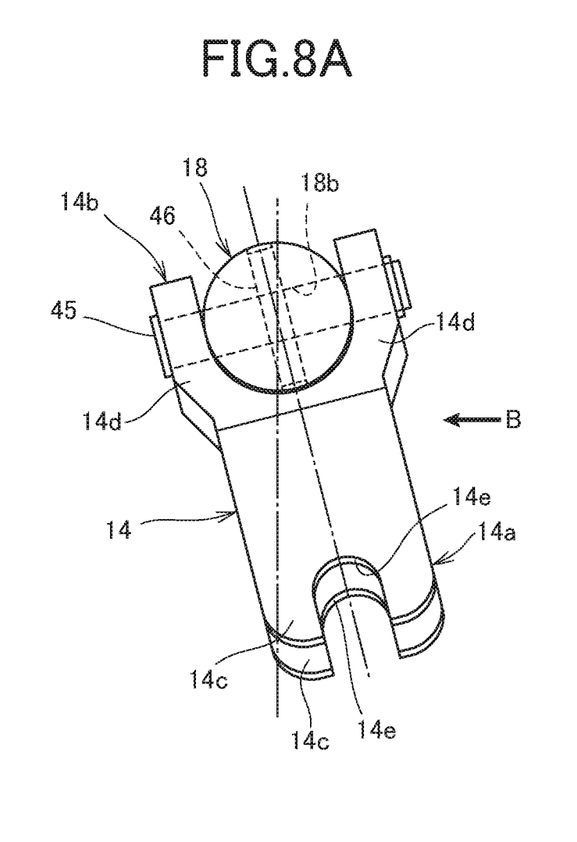
FIG. 8A is a view seen from an axial direction of the shaft.
Figure 8B:
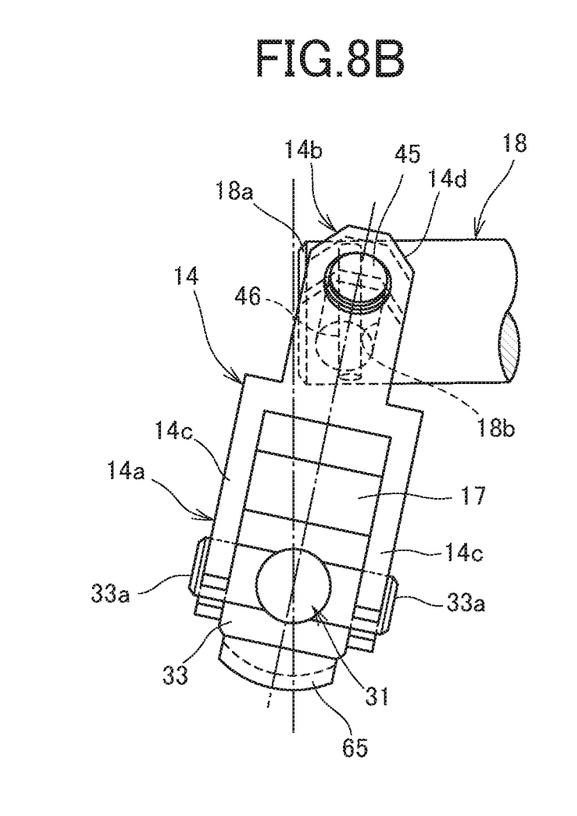
FIG. 8B is a view seen from an axial direction of the screw shaft.

FIGS. 8A and 8B are operational views showing an operation in a case where the shift operation and the select operation are simultaneously performed by the gear shift operation mechanism 10, FIG. 8A is a view seen from the axial direction of the shaft 18, and FIG. 8B is a view seen from the axial direction of the screw shaft 31.

As shown in FIG. 8A and FIG. 8B, even when the main lever 14 is caused to swing to maximum degrees respectively in the shift direction and the select direction, smooth swing can be made without difficulty in a connection portion of the nut 33 and the main lever 14 and a connection portion of the main lever 14 and the shaft 18, by forming the pin insertion hole 18*b* of the shaft 18 of the present embodiment to have the long hole section, and providing the inclined surfaces 18*d* and 18*e* (refer to FIGS. 7A and 7B) at the edge portion of the pin insertion hole 18*b* of the shaft 18.

That is, for the main lever 14 in the case where the main lever 14 is caused to perform only the shift operation, or only the select operation, as shown in FIG. 5 and FIG. 6, a change in the inclination which occurs to the main lever 14 can be absorbed by the connection pin 45 inclining in the pin insertion hole 18*b* which has the long hole section, and the other end arm portions 14*d* and 14*d* of the main lever 14 inclining along the inclined surfaces 18*d* and 18*e*, in FIG. 8A and FIG. 8B.

As shown in FIG. 1, FIGS. 5A and 5B, and FIGS. 6A and 6B as above, the gear shift operation mechanism 10 that rotates the shaft 18 in the shift direction by the main lever 14 as the lever, and moves the shaft 18 in the select direction by the main lever 14 includes the screw shaft 31 that configures the ball screw 13, the motor 12 that rotates the screw shaft 31, the nut 33 that is screwed onto the screw shaft 31, the clutch 16 that is disposed on the screw shaft 31, and the select lever 17 that is integrated with the screw shaft 31 by switching on of the clutch 16, and has restraint cancelled with respect to the screw shaft 31 by switching off the clutch 16, one end of the main lever 14 is engaged with the nut 33, the other end is engaged or connected with the shaft 18, and the select lever 17 is engaged with the main lever 14.

According to the configuration, by switching on the clutch 16 (an engaged state), the screw shaft 31 and the select lever 17 are integrated and the screw shaft 31 and the select lever 17 are rotated by the motor 12, whereby the main lever 14 is caused to swing around the screw shaft 31 and the shaft 18 can be moved in the select direction. Further, by switching off the clutch 16 (a disengaged state), the screw shaft 31 is rotated by the motor 12, the nut 33 is moved on the screw shaft 31 to cause the main lever 14 to swing, and the shaft 18 can be rotated in the shift direction. Accordingly, the shift operation and the select operation of the transmission can be performed with the single motor 12, reduction in size and weight, reduction in power consumption, simplification and reduction in the number of the component parts and actuating parts, and cost reduction can be achieved.

Further, since the clutch 16 is disposed to be close to the motor 12, wiring which is connected to the motor 12 and the clutch 16 can be easily organized, and since the length of the wiring can be reduced, cost and the number of assembly steps can be reduced by reducing the parts and the like which fix the wiring.

Further, since the shift position sensor 22 which senses the moving distance of the nut 33 is included, the moving distance of the nut 33 is sensed by the shift position sensor 22, and from the swing angle in the shift direction of the shaft 18 which swings with movement of the nut 33, the shift operation state can be obtained.

Further, the select position sensor 21 which senses the swing angle of the select lever 17 is included, whereby the swing angle of the select lever 17 is sensed by the select position sensor 21, and from the moving amount in the select direction of the shaft 18 which moves with swing of the select lever, the select operation state can be obtained.

Second Embodiment

Figure 9A:
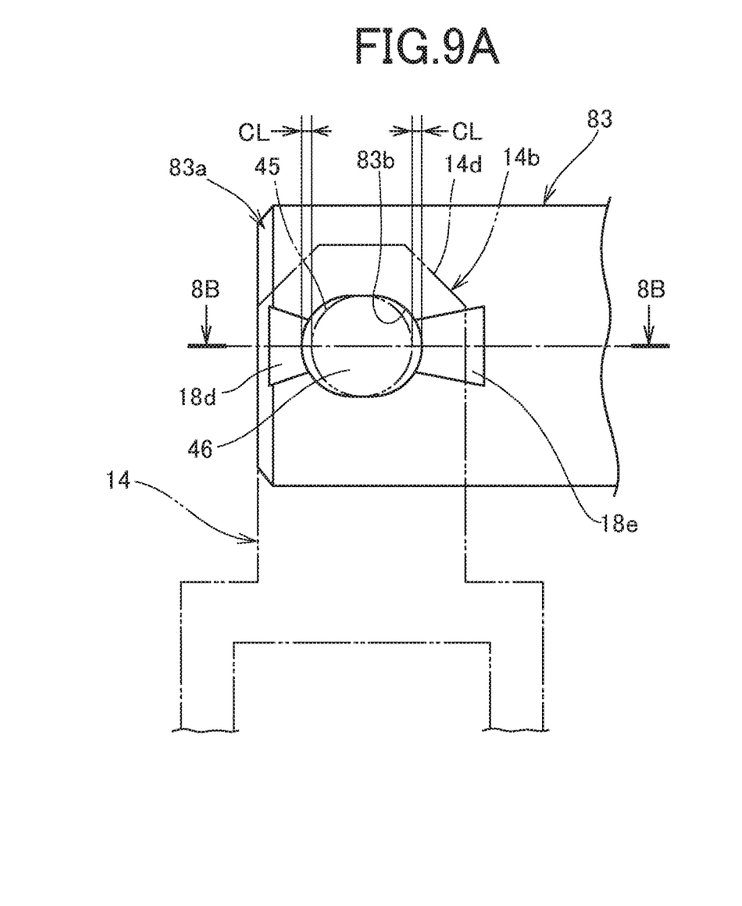
FIG. 9A is a side view of one end portion of the shaft.
Figure 9B:
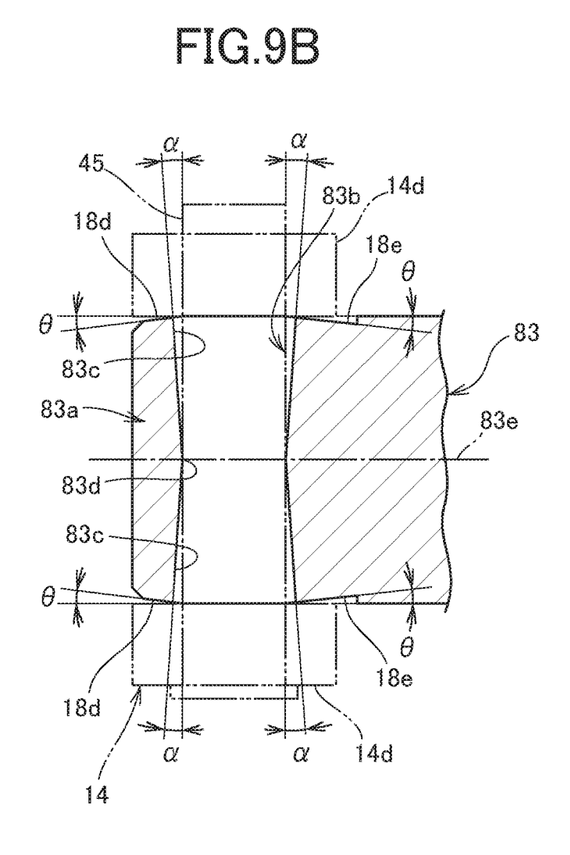
FIG. 9B is a sectional view along line 9B-9B in FIG. 9A.

FIGS. 9A and 9B are explanatory views showing one end portion 83*a* of a shaft 83 of a second embodiment, FIG. 9A is a side view of the one end portion 83*a* of the shaft 83, and FIG. 9B is a sectional view along line 9B-9B in FIG. 9A. The same components as in the first embodiment shown in FIGS. 7A and 7B will be assigned with the same reference signs, and the detailed explanation will be omitted.

As shown in FIGS. 9A and 9B, in the shaft 83, a pin insertion hole 83*b* which has a most of a section in an elliptical shape and is formed into a taper hole, in which the connection pin 45 is inserted, is bored in the one end portion 83*a*.

The pin insertion hole 83*b* includes two elliptical taper holes 83*c* and 83*c* which are in the same shapes and have sections in elliptical shapes, and a portion where the elliptical taper holes 83*c* and 83*c* contact each other (that is, an inside diameter portion 83*d* including an axial line 83*e* of the shaft 83) is formed to have a circular section, and the circular section gradually expands toward an outer circumferential surface to be formed into a taper shape which is elliptical in section. A long axis of the elliptical shape extends in the axial direction of the shaft 18. At an edge portion in a long axis direction of the pin insertion hole 83*b*, the inclined surfaces 18*d* and 18*e* which are disposed to a side nearer to the center in the radial direction of the shaft 83 as the inclined surfaces 18*d* and 18*e* are away from the edge portion are formed.

As described above, the pin insertion hole 83*b* includes the inside diameter portion 83*d* with the circular section, and therefore, by the inside diameter portion 83*d*, the connection pin 45 which is inserted into the pin insertion hole 83*b* is restrained from moving in the axial direction of the shaft 83. Accordingly, the penetration pin 46 which is shown in FIGS. 7A and 7B is not necessary.

Third Embodiment

Figure 10A:
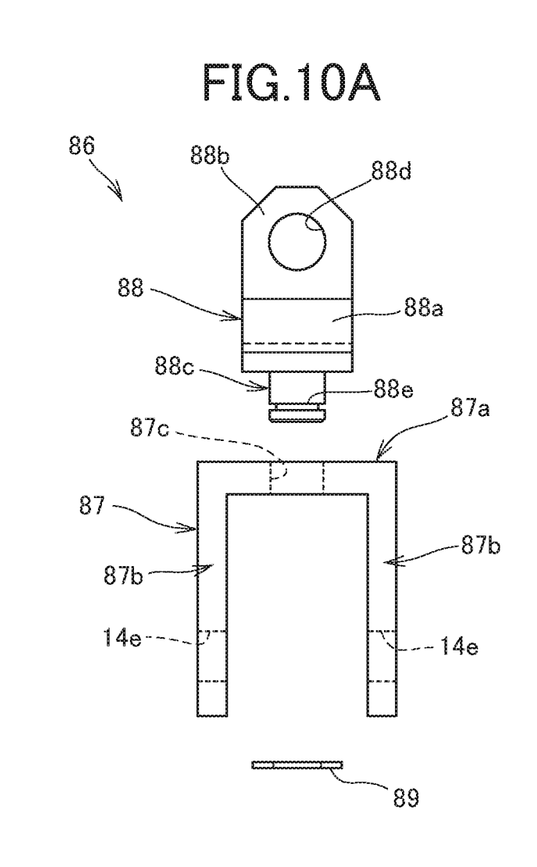
FIG. 10A is an exploded view of the main lever.
Figure 10B:
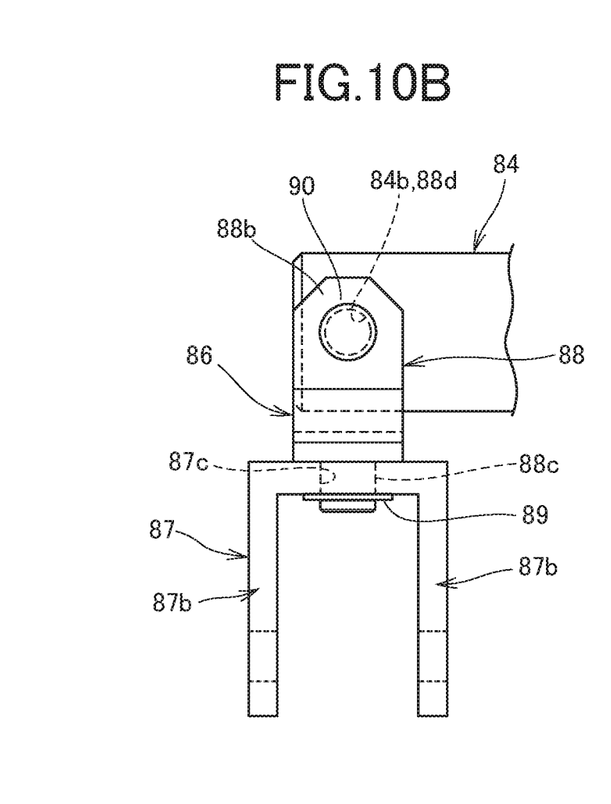
FIG. 10B is a side view showing a state where the main lever is assembled to a shaft.

FIGS. 10A and 10B are explanatory views showing a main lever 86 in a third embodiment, FIG. 10A is an exploded view of the main lever 86, and FIG. 10B is a side view showing a state where the main lever 86 is assembled to a shaft 84.

As shown in FIGS. 10A and 10B, the main lever 86 is formed of a one end side arm member 87 which is engaged with a nut 33 (refer to FIG. 1) side, the other end side arm member 88 which is connected to a shaft 84 (refer to FIG. 10B) side, and a retaining ring 89 which retains the other end side arm member 88 so that the other end side arm member 88 is not removed from the one end side arm member 87 when the one end side arm member 87 and the other end side arm member 88 are connected.

In the one end side arm member 87, a base portion 87a in a flat plate shape, and a pair of one end arm portions 87b and 87b which extend to be perpendicular to the base portion 87a from both ends of the base portion 87a are integrally formed.

In the base portion 87a, a through-hole 87c is bored in a center thereof. In the one end arm portions 87b, cutout portions 14e are formed, and the cutout portions 14e engage with the protruded pin 33a (refer to FIG. 1) of the nut 33 (refer to FIG. 1).

The other end side arm member 88 is formed of a base portion 88a, the other end arm portions 88b and 88b which extend parallel from both ends of the base portion 88a, and a connection shaft 88c which extends to an opposite side from the other end arm portions 88b and 88b from a center of the base portion 88a.

In the other end arm portions 88b and 88b, pin insertion holes 88d with circular sections are bored. The connection shaft 88c has an annular groove 88e formed in a vicinity of a tip end portion thereof, is inserted into the through-hole 87c of the one end side arm member 87, and has the retaining ring 89 fitted in the annular groove 88e after the connection shaft 88c is inserted, so that removable of the other end side arm member 88 from the one end side arm member 87 is prevented.

A very small clearance is formed between the through-hole 87c and the connection shaft 88c, and therefore, the connection shaft 88c is rotatably connected to the through-hole 87c. That is, the other end side arm member 88 is rotatably attached to the one end side arm member 87.

A connection pin 90 is inserted into the pin insertion holes 88d of the other end side arm member 88 and a pin insertion hole 84b which is bored in the shaft 84. The pin insertion hole 84b and the pin insertion holes 88d are straight round holes. The connection pin 90 is circular in section and is a straight pin.

Fourth Embodiment

Figure 11:
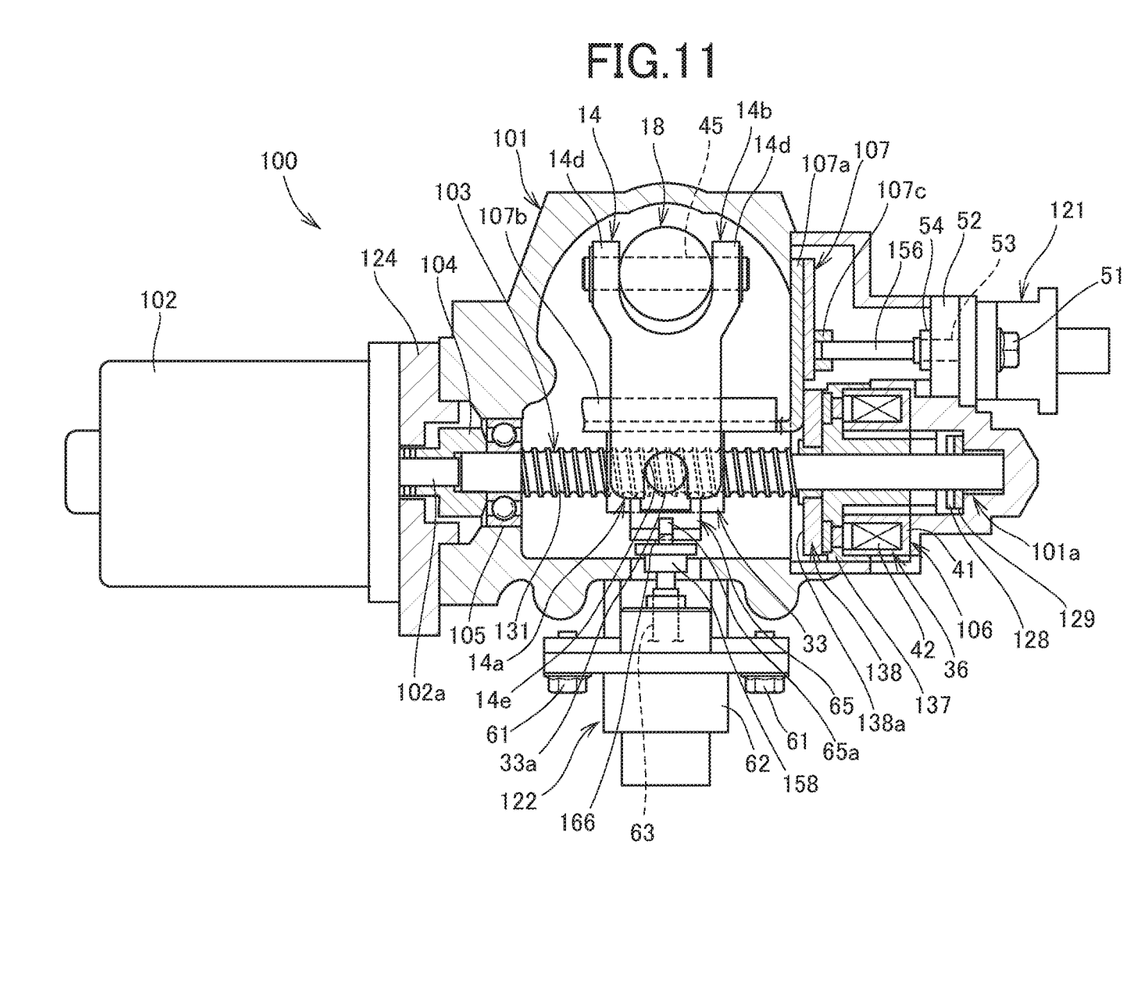
FIG. 11 is a sectional view showing a gear shift operation mechanism of a fourth embodiment.

FIG. 11 is a sectional view showing a gear shift operation mechanism 100 of a fourth embodiment.

The same components as in the first embodiment shown in FIG. 1 will be assigned with the same reference signs, and the detailed explanation will be omitted.

The gear shift operation mechanism 100 includes a box case 101, a motor 102, a ball screw 103, the main lever 14, a clutch 106, a select lever 107, the shaft 18, a select position sensor 121, and a shift position sensor 122.

In the box case 101, the ball screw 103, the main lever 14, the clutch 106, the select lever 107 and the shaft 18 which are described above are accommodated.

The motor 102 has a battery included in a vehicle as a drive source, is subjected to drive control by a drive control signal which is inputted from a computer included in the vehicle, and is attached to a side surface of the box case 101 with a plurality of bolts (not illustrated) via an adapter 124.

The ball screw 103 is configured by a screw shaft 131 which has one end attached to a rotational shaft 102a of the motor 102 via a joint 104 and supported rotatably by a bearing 105 which is provided in the box case 101, and the other end supported by a bearing portion 101a which is provided in the box case 101, and the nut 33 which is connected to the screw shaft 131 via a plurality of balls (not illustrated). Since a thrust load occurs to the screw shaft 131 at a time of rotation thereof, the thrust load is received by the bearing 105 at one end side of the screw shaft 131, and is received by a thrust bearing 129 which is provided between the bearing portion 101a and a flange portion 128 included in the screw shaft 131, at the other end side of the screw shaft 131.

The clutch 106 is an electromagnetic clutch, and includes the stator 36 which is attached to the box case 101, a rotor 137 which is rotatably fitted to the stator 36 and is integrally attached to the screw shaft 131, and an armature 138 which is fitted to the screw shaft 131 and is disposed to be adjacent to the rotor 137. The stator 36 is configured by the core 41 which is attached to the box case 101 and the coil 42.

The select lever 107 is an L-shaped member which is attached to the armature 138, and is obtained by integrally molding a base portion 107a which is attached to one side surface 138a of the armature 138, and an axial direction extended portion 107b which extends along the screw shaft 131 from one end of the base portion 107a to pass through an inside of the main lever 14.

The rotor 137 rotates together with the screw shaft 131 when energization for the coil 42 is stopped, whereas when the coil 42 is energized, the armature 138 is attracted to the rotor 137 by the excited core 41, and the select lever 17 which is fixed to the armature 138 rotates integrally with the screw shaft 131.

The shaft 18 is supported in such a manner as to be capable of rotating around the axis (rotation around the axis which extends in the front and back direction of the paper surface) with respect to the box case 101 by the main lever 14 swinging with the screw shaft 131 as a center, and to be capable of rotating around the axis (rotation around the axis which extends in the front and back direction of the paper surface) with respect to the box case 101.

The select position sensor 121 is a sensor which senses a rotation angle around the screw shaft 131 of the select lever 107, and is attached to a side portion of the box case 101.

The select position sensor 121 includes the sensor main body 52, the select sensor arm 54, and a select sensor sensing element 156 which is attached to an end portion of the select sensor arm 54 and is inserted in an engaging portion 107c which is provided at the select lever 107.

The shift position sensor 122 is a sensor which senses a moving amount of the nut 33 along the screw shaft 131 via the guide member 65, and is attached to a lower portion of the box case 101.

The shift position sensor 122 includes the sensor main body 62 which is attached to the box case 101 with a plurality of bolts 61, the rotating shaft 63, a shift sensor arm 158 which has one end portion attached to the rotating shaft 63, and a shift sensor sensing element 166 which is provided at the other end portion of the shift sensor arm 158, and the shift sensor sensing element 166 is inserted into the guide groove 65a of the guide member 65.

The aforementioned embodiment only shows one aspect of the present invention, and modifications and applications can be made arbitrarily within a range without departing from the gist of the present invention.

REFERENCE SIGNS LIST 10, 100 Gear shift operation mechanism
12, 102 Motor
13, 103 Ball screw
14, 86 Main lever (lever)
16, 106 Clutch
17, 107 Select lever
18, 83, 84 Shaft
21, 121 Select position sensor
22, 122 Shift position sensor
31, 131 Screw shaft
33 Nut

The invention claimed is:

1. A gear shift operation mechanism that rotates a shaft in a shift direction by a lever, and moves the shaft in a select direction by the lever, comprising:
 a screw shaft that configures a ball screw;
 a motor that rotates the screw shaft;
 a nut that is screwed onto the screw shaft;
 a clutch that is disposed on the screw shaft; and
 a select lever that is integrated with the screw shaft by switching on the clutch and that is unrestrained with respect to the screw shaft by switching off the clutch, wherein
 one end of the lever is engaged with the nut, the other end is engaged with the shaft, and the select lever is engaged with the lever,
 the lever includes a pair of arm portions, and the select lever is inserted between the arm portions with no clearance between the arm portions and the select lever such that the select lever is relatively movable in an axial direction of the shaft with respect to the arm portions, and
 the clutch includes an armature, and one end of the select lever is coupled to the armature.

2. The gear shift operation mechanism according to claim 1, further comprising a shift position sensor that senses a moving distance of the nut.

3. The gear shift operation mechanism according to claim 1, further comprising a select position sensor that senses a swing angle of the select lever.

4. The gear shift operation mechanism according to claim 1, wherein the select lever includes a section that is parallel to the screw shaft.

5. The gear shift operation mechanism according to claim 1, wherein a first end of the select lever is coupled to the clutch, and a second end of the select lever is rotationally fitted to the screw shaft.

6. The gear shift operation mechanism according to claim 1, wherein engagement between the select lever and the arms causes the lever to move the shaft in the select direction when the clutch is switched on.

7. A gear shift operation mechanism that rotates a shaft in a shift direction by a lever, and moves the shaft in a select direction by the lever, comprising:
 a screw shaft that configures a ball screw;
 a motor that rotates the screw shaft;
 a nut that is screwed onto the screw shaft;
 a clutch that is disposed on the screw shaft; and
 a select lever that is integrated with the screw shaft by switching on the clutch and that is unrestrained with respect to the screw shaft by switching off the clutch, wherein
 one end of the lever is engaged with the nut, the other end is engaged with the shaft, and the select lever is engaged with the lever,
 the lever includes a pair of arm portions, and the select lever is inserted between the arm portions with substantially no clearance between the arm portions and the select lever such that the select lever is relatively movable in an axial direction of the shaft with respect to the arm portions, and
 a first end of the select lever is coupled to the clutch, and a second end of the select lever is rotationally fitted to the screw shaft.

8. The gear shift operation mechanism according to claim 7, further comprising a shift position sensor that senses a moving distance of the nut.

9. The gear shift operation mechanism according to claim 7, further comprising a select position sensor that senses a swing angle of the select lever.

10. The gear shift operation mechanism according to claim 7, wherein the select lever includes a section that is parallel to the screw shaft.

11. The gear shift operation mechanism according to claim 7, wherein the clutch includes an armature, and one end of the select lever is coupled to the armature.

12. The gear shift operation mechanism according to claim 7, wherein engagement between the select lever and the arms causes the lever to move the shaft in the select direction when the clutch is switched on.

\* \* \* \* \*